United States Patent
Lerum et al.

(10) Patent No.: US 9,442,744 B2
(45) Date of Patent: *Sep. 13, 2016

(54) MULTILINGUAL BUILD INTEGRATION FOR COMPILED APPLICATIONS

(75) Inventors: Cameron B. Lerum, Renton, WA (US); Jan Anders Nelson, Gig Harbor, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 695 days.

This patent is subject to a terminal disclaimer.

(21) Appl. No.: 13/563,579

(22) Filed: Jul. 31, 2012

(65) Prior Publication Data

US 2013/0226555 A1 Aug. 29, 2013

Related U.S. Application Data

(63) Continuation-in-part of application No. 13/403,822, filed on Feb. 23, 2012, now Pat. No. 8,789,015.

(51) Int. Cl.
*G06F 17/28* (2006.01)
*G06F 9/44* (2006.01)

(52) U.S. Cl.
CPC .................................. *G06F 9/4448* (2013.01)

(58) Field of Classification Search
USPC ....................................................... 704/2–10
See application file for complete search history.

(56) References Cited

U.S. PATENT DOCUMENTS

| | | | |
|---|---|---|---|
| 6,119,079 A | 9/2000 | Wang et al. | |
| 7,533,372 B2 | 5/2009 | Rettig et al. | |
| 7,571,092 B1 | 8/2009 | Nieh | |
| 7,680,780 B2 | 3/2010 | Dettinger et al. | |
| 7,814,415 B2 | 10/2010 | Cox | |
| 7,983,895 B2 | 7/2011 | McEntee et al. | |
| 8,789,015 B2 | 7/2014 | Lerum et al. | |
| 8,819,628 B2 | 8/2014 | Raj | |
| 9,400,784 B2 | 7/2016 | Lerum et al. | |
| 2003/0084401 A1 | 5/2003 | Abel et al. | |
| 2003/0135358 A1 | 7/2003 | Lissauer et al. | |

(Continued)

OTHER PUBLICATIONS

"International Search Report", Application No. PCT/US2013/052604, Nov. 21, 2013, 4 pages.

(Continued)

*Primary Examiner* — Leonard Saint Cyr
(74) *Attorney, Agent, or Firm* — Micky Minhas

(57) ABSTRACT

Multilingual build integration for compiled applications is described in which support for application localization of compiled programming languages is provided as an integrated component of a development environment. Localizations integrate with application builds in the development environment so that updates are synchronized with project resources for multiple languages. This involves producing translation target files (e.g., localization files) for one or more selected languages by parsing and interpreting source files for the project to identify resources for translation. Localization files in the project that have been updated may be exposed in various ways for translation via the system, a translation service, or other translation source. Translated localization files are used to create dynamic resource files for the particular programming language that are compiled as part of the build process into language specific resource files. Compiled language specific resource files for multiple languages may then be packaged together for distribution.

20 Claims, 8 Drawing Sheets

(56) References Cited

U.S. PATENT DOCUMENTS

| | | | |
|---|---|---|---|
| 2005/0033718 | A1 | 2/2005 | Rettig et al. |
| 2005/0050526 | A1 | 3/2005 | Dahne-Steuber et al. |
| 2006/0271920 | A1 | 11/2006 | Abouelsaadat |
| 2006/0287844 | A1 | 12/2006 | Rich |
| 2007/0169013 | A1 | 7/2007 | Bak et al. |
| 2007/0282594 | A1 | 12/2007 | Spina |
| 2008/0127045 | A1* | 5/2008 | Pratt ............... G06F 9/4448 717/104 |
| 2009/0094609 | A1 | 4/2009 | Burukhin et al. |
| 2009/0132232 | A1 | 5/2009 | Trefler |
| 2009/0204385 | A1 | 8/2009 | Cheng et al. |
| 2009/0222787 | A1 | 9/2009 | Aldahleh et al. |
| 2009/0276206 | A1 | 11/2009 | Fitzpatrick et al. |
| 2009/0282394 | A1 | 11/2009 | Raj |
| 2001/0119676 | | 5/2011 | Gallant |
| 2011/0119676 | A1* | 5/2011 | Gallant .................... 718/104 |
| 2011/0191703 | A1* | 8/2011 | Doser et al. ............. 715/763 |
| 2012/0284690 | A1 | 11/2012 | Blakeley et al. |
| 2013/0006603 | A1 | 1/2013 | Zavatone et al. |
| 2013/0227522 | A1 | 8/2013 | Lerum |
| 2014/0309983 | A1 | 10/2014 | Lerum et al. |

OTHER PUBLICATIONS

"Non-Final Office Action", U.S. Appl. No. 13/403,822, (Nov. 6, 2013), 22 pages.

Esselink, Bert "The Evolution of Localization", *Multilingual Computing and Technology* (2003), Available at <http://isg.urv.es/library/papers/Esselink_Evolution.pdf>, (Jul. 2003), pp. 21-29.

Hojtsy, Gabor "Multilingual Web Applications with Open Source Systems", Thesis, Budapest University of Technology and Economics, Available at <http://buytaert.net/files/gabor-hojtsy-thesis.pdf>,(May 18, 2007), 85 pages.

"Notice of Allowance", U.S. Appl. No. 13/403,822, Mar. 17, 2014, 7 pages.

Bateman, "Enabling technology for multilingual natural language generation: the KPML development environment", Natural Language Engineering, vol. 3 Issue 1, Mar. 1997, 42 pages.

Bateman, et al., "Multilingual natural language generation for multilingual software: a functional linguistic approach", Applied Artificial Intelligence, vol. 13, Issue 6, Aug. 1999, 26 pages.

"Non-Final Office Action", U.S. Appl. No. 14/318,052, Jun. 19, 2015, 26 pages.

Notice of Allowance, U.S. Appl. No. 14/318,052, Apr. 18, 2016, 14 pages.

Lewis,"Web Service Integration for Next Generation Localization", In Proceedings of WWW 2009, Available at <http://www.aclweb.org/anthology/W/W09/W09-1509.pdf>, Jun. 5, 2009, pp. 47-55.

Final Office Action, U.S. Appl. No. 14/318,052, Dec. 9, 2015, 29 pages.

\* cited by examiner

MULTILINGUAL BUILD INTEGRATION FOR COMPILED APPLICATIONS

PRIORITY

This application is a continuation-in-part of and claims priority under 35 U.S.C. §120 to application Ser. No. 13/403,822 filed Feb. 23, 2012 and titled "Integrated Application Localization," the disclosure of which is incorporated by reference herein in its entirety.

BACKGROUND

Globalization and localization of applications refers to a process of designing and developing applications that function for different languages, cultures, and locales. One challenge associated with creating multilingual applications is handling of translations for different languages and incorporation of the translations for testing of different builds in the development process. Traditionally, integrated development environments (IDEs) provide limited tools for translations and localizations. Thus, developers may be forced to conduct translation related activities on their own (e.g., outside of activities managed by the IDE), which can be time consuming and costly. Moreover, multiple individual language specific resource files corresponding to each selected language are typically maintained for a development project and the developer may have to expend considerable effort each time updates are made to populate the updates across the multiple language specific resource files and obtain translations. These complexities act as barriers that may make it difficult or prohibitive for some developers (e.g., individuals and small entities) to produce multilingual applications.

SUMMARY

Multilingual build integration for compiled applications is described in which support for localization of compiled programming languages is provided. Localizations integrate with application builds in a development environment so that updates are synchronized with project resources for multiple languages. This involves producing target translation files (e.g., localization files) for one or more selected languages by parsing and interpreting source files for the project to identify resources for translation. Localization files in the project that have been updated may be exposed in various ways for translation via the system, a translation service, or other translation source. Translated localization files are converted to create dynamic resource files for the particular programming language that are then compiled as part of the build process into language specific resource files for the project. Compiled language specific resource files for multiple languages may then be packaged together for distribution in accordance with a publishing model for the particular programming language.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Multilingual build integration for compiled applications is described in which support for localization of compiled programming languages is provided. Localizations integrate with application builds in a development environment so that updates are synchronized with project resources for multiple languages. This involves producing target translation files (e.g., localization files) for one or more selected languages by parsing and interpreting source files for the project to identify resources for translation. Localization files in the project that have been updated for a build may be exposed in various ways for translation via the system, a translation service, or other translation source. Translated localization files are converted to create dynamic resource files in a format for the particular programming language that are then compiled as part of the build process into language specific resource files for the project. Compiled language specific resource files for multiple languages may then be packaged together for distribution in accordance with a publishing model for the particular programming language.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Lastly, an example system and components of the system are described that can be employed in one or more embodiments.

Example Operating Environment

Figure 1:
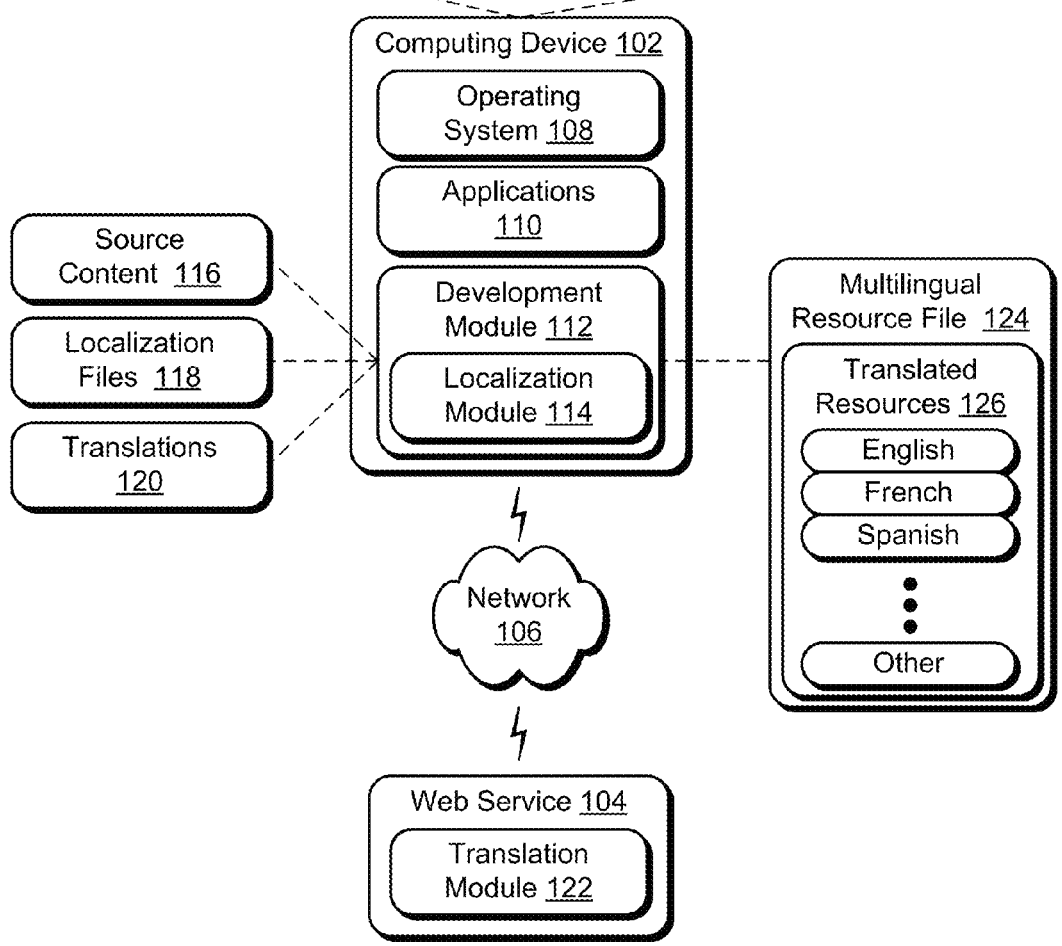
FIG. 1 is an illustration of an environment in an example implementation that is operable to employ integrated localization techniques.

FIG. 1 is an illustration of an environment 100 in an example implementation that is operable to employ techniques described herein. The illustrated environment 100 includes a computing device 102 and a web service 104 that are communicatively coupled via a network 106. The computing device 102 and the web service 104 may each be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone), a game console, and so forth. The computing device 102 may be configured as any suitable computing system and/or device that employ various processing systems, some additional examples of which are discussed in relation to the example system of FIG. 8.

The computing device 102 is further illustrated as including an operating system 108. Generally speaking, the operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device without understanding how this rendering will be performed. The operating system 108 may provide various services, interfaces, and functionality that applications 110 may invoke to take advantage of system features. A variety of applications 110 to provide a wide range of functionality to the computing device 102 are contemplated including but not limited to a browser, an office productivity application, an email client, a multimedia management program, device management software, a software development environment, and networking applications, to name a few examples.

The operating system 108 may also represent a variety of other functionality, such as to manage a file system and a user interface that is navigable by a user of the computing device 102. An example of this is illustrated as the user interface configured as an application launcher or start screen (e.g., desktop) for the computing device 102 that is depicted in FIG. 1. The representations or tiles as shown in the illustrated example are selectable to launch a corresponding one of the applications 110 for execution on the computing device 102. In this way, a user may readily navigate through a file structure and initiate execution of applications of interest.

The operating system 108 further provides services, interfaces, and functionality for different kinds of applications including "legacy" applications that may be written using statically compiled languages (e.g., "compiled" applications), such as C++, C# and "modern" applications that may be written using dynamic scripting languages, such as JavaScript, hypertext markup language revision 5 and/or cascading style sheets (HTML5/CSS), and extensible application mark-up language (XAML). Modern applications may operate through one or more runtime platforms supported by the operating system 108 that are configured to provide respective execution environments for corresponding applications. Runtime platforms provide a common set of features, routines, and functions for compatible applications thereby offloading coding of common tasks from application development. Thus, runtime platforms can facilitate portability of applications to different kinds of systems with little or no change to the dynamic script for the applications and/or without recompiling. Examples of runtime platforms include JAVA™ runtime environment (JRE), Adobe™ Flash™, Microsoft™.NET framework, Microsoft Silverlight™, and WinRT™, to name a few examples.

The computing device 102 also includes a development module 112 that represents functionality operable to provide an integrated development environment (IDE) for development of applications 110. The development module 112 generally provides application lifecycle management including support for design, development, testing, and/or deployment of applications. The development module 112 may support different programming languages and integrate different components to simplify application development such as a code editor, a compiler, build automation tools, a debugger, and so forth. Thus, the development module 112 provides functionality for a developer to create/edit source content 116 for a project and compile the source content 116 to build an application 110.

In accordance with techniques described herein, the development module 112 may include or otherwise make use of a localization module 114. The localization module 114 represents functionality operable to create and manage translation files for a project from within an IDE. The localization module 114 is further configured to coordinate management and synchronization of project updates across multiple selected languages as resources in a development project are updated. As discussed in greater detail below, the localization module 114 enables developers to create multilingual applications that use a single language resource file or package. The integration of localization functionality within the IDE implemented via the localization module 114 enables developers to use familiar menus, dialogs, tools, commands, and interfaces to handle translation related activities alongside with application development activities.

In operation, a developer may use the IDE to design, define, create and edit source content 116 (e.g., code, images, styles, annotations, etc.) in a project for an application. In the course of developing the application, a number of builds of the project may occur. The localization module 114 enables the developer to specify multiple languages for translations of the project into different languages. This causes localization files 118 corresponding to each of the specified languages to be created as part of the project. The localization files 118 may correspond to translation projects for each selected language that are linked to or otherwise associated with an application development project and used to store, manage, and update translations 120 for the corresponding application. The localization module 114 implements updating of localization files 118 as part of the build process so that the localization files 118 reflect updates as resources are updated in the project and/or for each build. The localization module 114 may also determine when a string or resource is removed from the project and can remove corresponding translations as part of the update process.

Separate localization files 118 may be created for each additional language selected for a project. A standard, designated file format for the localization files 118 is employed to facilitate translations 120 in various ways and by various translation sources. The designated file format is generally configured to provide a consistent and expected format for project resources that are to be translated. Using a designated file format that is widely accepted and compatible with a variety different translation techniques and sources provides the developer with flexibility to handle translations 120 in many different ways. The localization module 114 may be configured to create localization files 118 in the designated file format and handle conversions of resources, log files, and other data between the designated file format and native, system formats for the operating system 108, IDE, and/or a particular project.

A variety of suitable file formats for handling translations 120 are contemplated. One example file format suitable to implement the described techniques is XLIFF (extensible markup language localization interchange file format). XLIFF is an XML-based format created to standardize exchange of data for localization. XLIFF specifies elements and attributes to aid in localization and can be employed as a transport mechanism for localizable data between compatible processes, systems, and entities. Although XLIFF is used by way of example in various places herein, it is to be appreciated that other formats suitable to transport localizable data for translations may also be employed.

For each build, the localization module 114 may provide and expose localization files 118 to obtain corresponding translations 120. Translations 120 may be generated in any suitable way. For example, localization files 118 may be exported to a web service 104 that includes or makes use of a translation module 122. The translation module 122 represents functionality operable to translate files into designated languages. The translation may include manual translations facilitated via the translation module 122 (e.g. via an editing tool/interface), machine translation techniques, pseudo-translations, and/or combinations thereof. Although illustrated as being provided via the web service 104, a translation module 122 may also be provided as a component of the development module 112, as a service accessible through the development module 112, as a standalone application, and so forth. In some embodiments, the localization module 114 may provide an editor module that may be used to edit and translate localization files. When exporting files, the localization module 114 may include the editor module and/or a link to enable downloading of the editor module with the exported files. Thus, the localization module 114 may email or otherwise send out localization files 118 for translation to one or more selected translation sources (e.g., individuals, a pseudo-translation engine, translation services, service providers, etc.) and may optionally include the editor module to facilitate translations by the translation sources.

Additionally the localization module 114 may incorporate a pseudo-translation engine that can be used for localization testing. Pseudo-translation is used to translate a project into a pseudo language to identify translation issues such as hard-coded, concatenated, and/or truncated strings as well as line breaks, spacing problems, visual issues, attribute value translation issues, or other issues that can result in some translations. These kinds of issues may result due to changes in string length and attribute values for elements (generally string growth) that occurs when string are translated. The pseudo-translation engine may be employed to simulate various character, string length, and/or attribute value changes that may result in translation issues. The pseudo-translation engine can therefore operate to produce a pseudo-translation in accordance with techniques described herein. For instance, a pseudo language may be selected by a developer as one of the translation languages for a project. Pseudo-translations into the pseudo language are produced via the pseudo-translation engine in XLIFF or another designated format and can be edited in the same manner as other language translations.

As described in detail in relation to the following example procedures, the localization module 114 may consume translations 120 to produce a multilingual application that uses a single resource file for multiple selected languages. In particular, the localization module 114 may integrate creation of multilingual resource files with development via an IDE of modern applications (e.g., applications written using dynamic scripting languages such as XAML, HTML/CSS, and/or Java Script). The same or a different localization module 114 may also be configured to support creation of multilingual resource files for legacy and other compiled applications that may be incorporated and distributed via an appropriate package. As represented in FIG. 1, a multilingual resource file 124 (or package) may be produced via the development module 112 with assistance of the localization module 114 based on translations 120 of localization files 118 exposed to translation sources using XLIFF or another suitable file format. The multilingual resource file 124 is configured to contain translated resources 126 for multiple languages in a single file/package. The translated resources 126 resources may be updated based upon available translations 120 for each build of the application. In this manner, developers may focus on creating an application in one language and obtain support/functionality for making the application multilingual as an integrated part of the development process with little additional effort.

Having considered an example operating environment, consider now some example procedures for integrated application localization in accordance with one or more embodiments.

Integrated Localization Details

The following discussion describes implementation details of integrated localization techniques that may be implemented utilizing the previously described systems and devices. In particular, general details of integration of localizations within an IDE are described in relation to an example procedure of FIG. 2. Thereafter, a section titled "Integrated Application Localization" addresses localization techniques applicable to modern applications that make use of dynamic script languages and/or produce log files as part of a build process that describe build updates and can be leveraged to implement in-build localizations. Then, a section titled "Multilingual Build Integration for Compiled Applications" discusses extensions of localization techniques to support applications that employ statically compiled programming languages and/or applications for which suitable log files describing build updates may otherwise be unavailable.

Aspects of each of the procedures described below may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment discussed above. In at least some embodiments, the procedures may be performed by a suitably configured computing device, such as the example computing device 102 of FIG. 1 that includes or otherwise makes use of a localization module 114.

Figure 2:
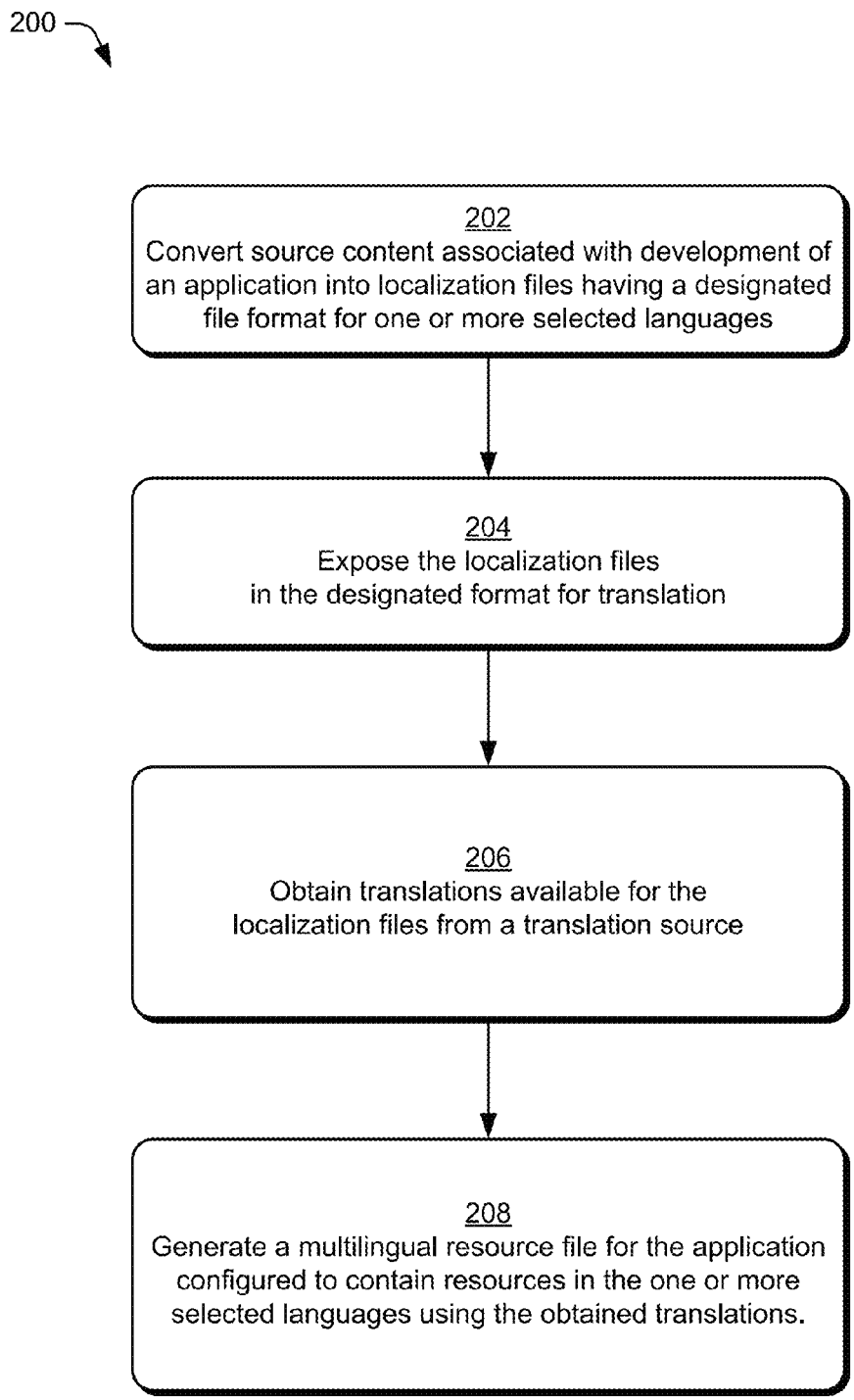
FIG. 2 is a flow diagram depicting a procedure in an example implementation in which a multilingual resource file or package is generated.

FIG. 2 depicts a procedure 200 in an example implementation in which a multilingual resource file or package is generated. Source content associated with development of an application is converted into localization files having a designated file format for one or more selected languages (block 202). For instance, a development module 112 may provide an IDE that a developer may employ to develop an application. In accordance with techniques described herein the development module 112 may include a localization module 114 to facilitate creation of the application as a multilingual application. The developer is therefore able to select different languages for the application, which causes corresponding localization files to be created for each selected language. For instance, the developer may input selections of languages from a menu or other user interface instrumentality provided in connection with a project for the application. In response to these selections, the localization module 114 may create sub-projects for each selected language. The sub-projects may include respective localization files 118 to contain resources that are updated and translated as an integrated part of the development process. The localization files 118 may be implemented via XLIFF or another designated file format used to facilitate translations. During the build process for the application, existing localization files 118 in a project may be automatically updated with changes made to source content in the project and/or new localization files for selected languages may be created. This may involve conversions of resources and data between a native or system format used by the IDE for the project and the designated file format. Additional details regarding creation and use of suitable localization files 118 for modern and legacy applications are discussed below in relation to FIGS. 3-7.

The localization files are exposed in the designated format for translation (block 204). For instance, localization files 118 that are updated to reflect changes made during a build may be exposed for translation in various ways. As mentioned, a variety of techniques and translation sources may be employed to conduct translations. For example, a developer may input selections via the localization module 114 to export localization files 118 to a selected local or network storage location, send files to recipients via email or other communications, invoke a integrated translator of the system or a remote web service 104 configured to perform translations, launch an editor module to perform manual translations, or otherwise interact with one or more translation sources to initiate and/or perform translations of the localization files 118.

Translations that are available are obtained for the localization files from a translation source (block 206). Translations may be driven by the build process in the sense that localization files 118 used for translations are produced as a part of the build process. The actual translations, though, may be performed asynchronously so that the build process is not delayed while waiting for translations. Translations initiated in a particular build may not be ready for incorporation in the application until a subsequent build. Accordingly, the localization module 114 may be configured to check for available translations during each build and obtain/incorporate available translations that are completed based on previous builds. Translations 120 produced by and/or returned from translation sources may be stored in a particular storage location that is accessible by the localization module 114 to obtain available translations. The translations 120 may be provided in XLIFF or another suitable file format as discussed previously.

Resources for which translations are available may be incorporated in a multilingual resource file or package during a particular build. If translations for resources or languages are not available, however, then incorporation of those resources or languages does not occur until translations are available (e.g., in a subsequent build). Thus, the process of updating localization files 118 with changes, obtaining corresponding translations, and incorporating language specific resources into an application build may involve multiple build passes. Additional details regarding incorporation of translated resources for multiple languages are discussed below in relation to example procedure of FIG. 5.

A multilingual resource file is generated for the application that is configured to contain resources in the one or more selected languages using the obtained translations (block 208). Here, translated resources that are available from translations 120 corresponding to one or more languages may be extracted, processed, compiled and/or added to multilingual resources available for the corresponding application. The localization module 114 may operate to convert resources described in XLIFF (or other standard format) back into a native system format. The localization module 114 combines translated resources 126 for multiple languages to form a single multilingual resource file 124 or an appropriate package for distribution of the application. Thus, the localization module 114 coordinates updates across multiple languages and automatically synchronizes inclusion of available translations into a multilingual resource file or package. Additional aspects of techniques for integrated application localization are discussed in relation to the following figures.

Integrated Application Localizations

Figure 3:
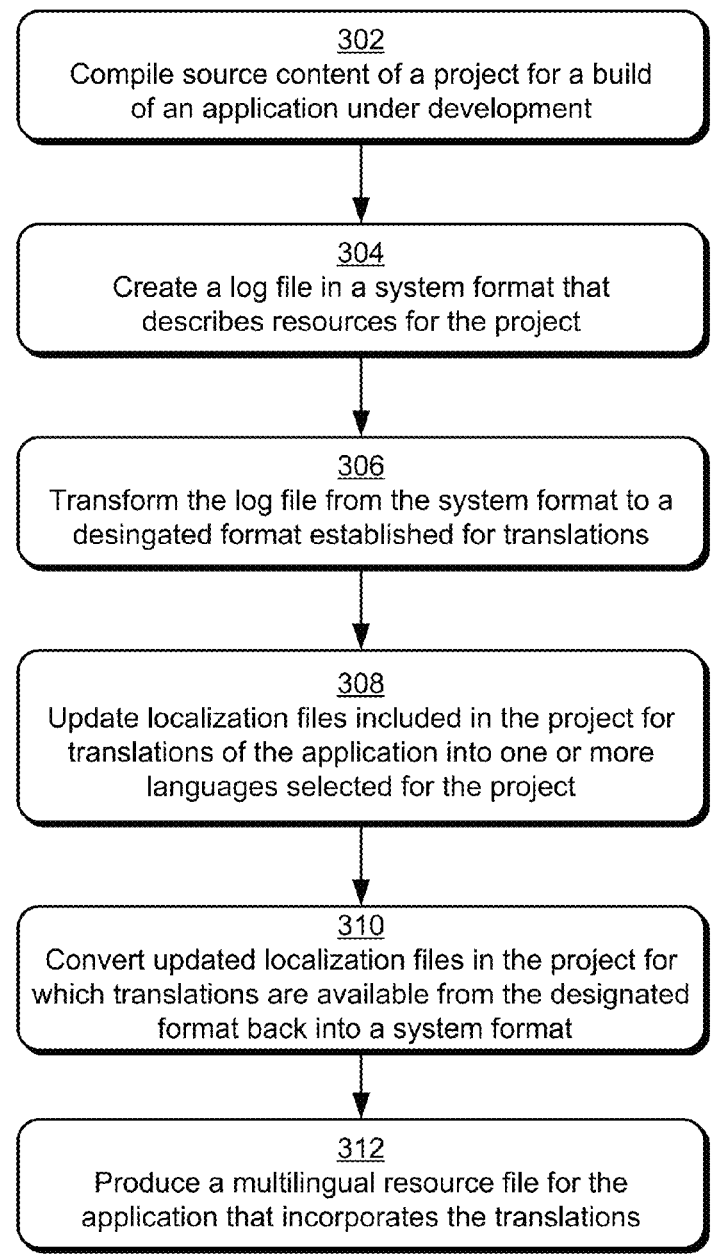
FIG. 3 is a flow diagram depicting a procedure in an example implementation in which application localization is integrated with a build process for an application development project.

FIG. 3 depicts a procedure 300 in an example implementation in which application localization is integrated with a build process for an application development project. Source content of a project for a build of an application under development is compiled (block 302). For instance, a compiler of a development module 112 may be invoked to compile the project. A log file is created in a system format that describes resources for the compiled project (block 304). For example, the development module 112 by may create a log file that logs resources for a particular build. The log file reflects any changes made to the source content for the project and corresponding resources. The log file may be output in a native, system format for the IDE, operating system 108, and/or particular project.

The log file is transformed from the system format to a designated format established for translations (block 306). To do so, the localization module 114 may be configured to convert the log file to a designated format, such as XLIFF. The transformation creates a source resource file for the project that can be employed to update language specific localization files 118. Thus, a common source resource file may be used to populate changes to localization files 118 corresponding to multiple different languages.

In particular, localization files that are included in the project for translations of the application into one or more languages selected for the project are updated (block 308). As mentioned, different localization files may be included in a project for different languages selected by a developer. These target files may use a file format that is designated for translations, such as XLIFF. The source resource file may be used to update the different target localization files with any changes for the build. This may include updating localization files that reflect previous translations and/or populating localization files for newly selected languages with resources described in the source resource file. In general, modifications, additions, or deletions of resources described by the source resource file may be merged with the localization files to produce updated localization files. Resources that have already been translated and have not changed, though, are preserved in the updated localization files to avoid having to re-translate these resources. Updated localization files may then be exposed for translation in various ways as discussed above and below.

Updated localization files in the project for which translations are available are converted from the designated format back into a system format (block 310) and a multilingual resource file for the application is produced that incorporates the translations (block 312). Here, for the particular build, the localization module 114 may obtain available translated resources 126 and incorporate the translated resources 126 into a multilingual resource file 124 for the corresponding application. Translation activities may be conducted using a designated file format such as XLIFF. Thus, the incorporation of translated resources into an application involves conversion of translations from the designated file format back into an appropriate system format for the multilingual resource file 124. The localization module 114 is configured to determine resources to include in the multilingual resource file based on available translations and handle the conversions.

Figure 4:
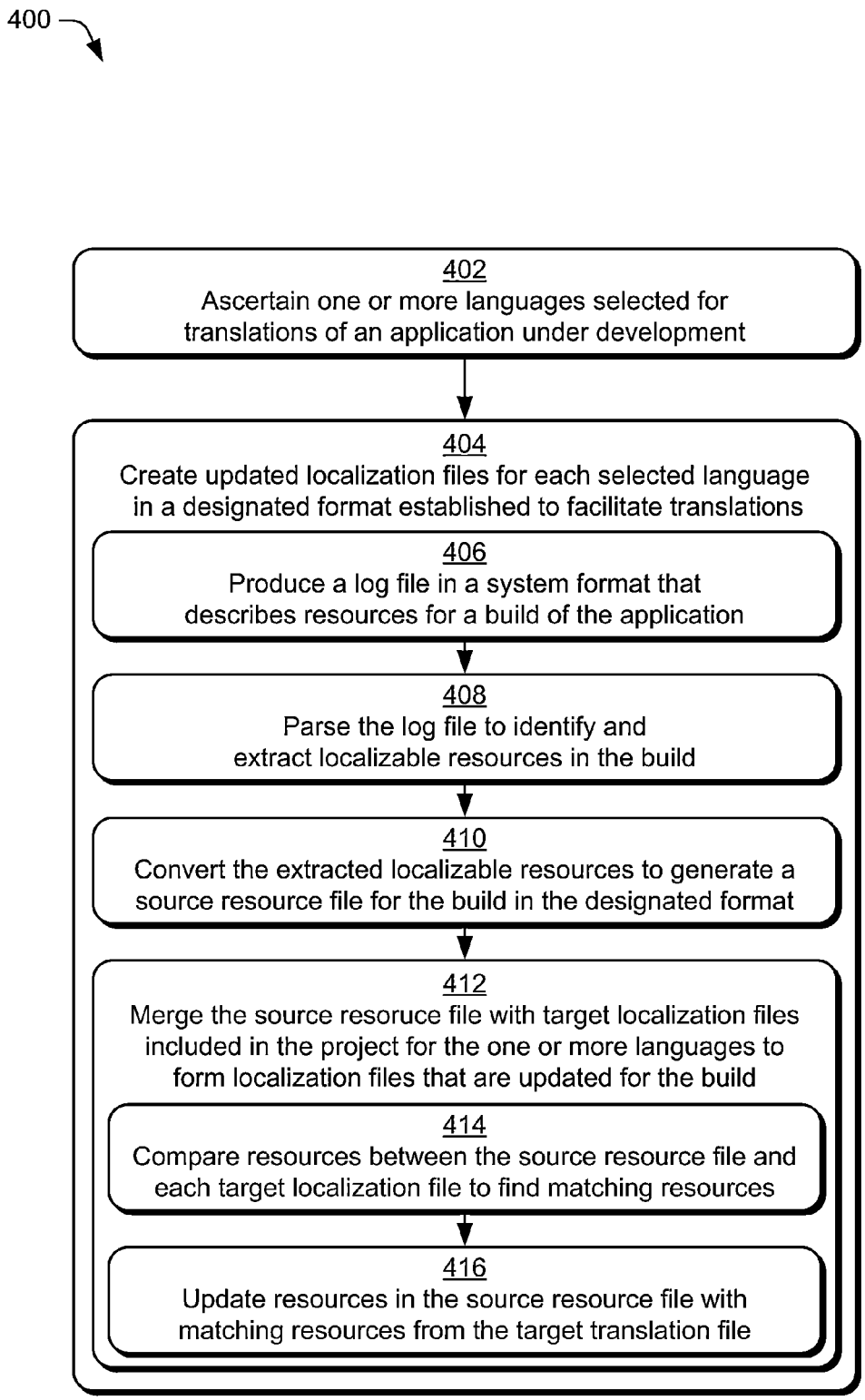
FIG. 4 is a flow diagram depicting a procedure in an example implementation in which localization files are created to facilitate translations.

FIG. 4 is a flow diagram depicting a procedure 400 in an example implementation in which localization files are created to facilitate translations. One or more languages are ascertained that are designated for translations of an application under development (block 402). For example, a developer may select multiple languages for a project as mentioned previously. This may occur at various times including when the project is initiated, as part of source content creation/editing, during a build, and so forth. Selection of different languages for a project may cause association of sub-projects (e.g., translation projects) with the project that are configured to contain corresponding localization files 118 for different languages. The project may include data indicative of the selected languages that the localization module 114 may reference to recognize languages designated for the project. In one approach, localization files 118 may be created in the project for languages that are designated. Initially, the localization files 118 may be placeholders that contain little or no data regarding project resources. The localization files 118 may then be populated with data during builds as described above and below. In another approach, creation of localization files for newly designated languages occurs as part of the updating process performed during builds. In this case, pre-existing files for some languages may be updated and data indicative of newly selected languages in the project may be used to trigger creation of corresponding localization files 118.

Updated localization files are created for each of the designated languages in a designated format established to facilitate translations (block 404). This may occur in any suitable way. In general, the localization module 114 may perform processing during a build to identify resources that are "localizable" and produce corresponding localization files. In other words, the localization module 114 may distinguish between data such as elements, strings, and tags for a project that are to be translated, e.g., localizable resources, and other data of the project that may not be suitable for translation such as language-neutral terms, proper names, universal code, numbers, and so forth. Separation of localizable resources in this manner serves to simplify the translation process and avoid unnecessary processing. In some embodiments, a pseudo translation engine may be employed by the localization module 114 to assist in recognition of localizable resources. The localization module 114 may also parse metadata associated with resources (e.g., comments, resource IDs, categorization data, tags, etc.) to support recognition of localizable resources and creation of translations via an editor module or other translation source. Metadata for example may include particular tags or other data that the localization module 114 can reference to perform and control automated processes for pseudo translation, machine translation, and/or validation of translated resources.

One example approach to create updated localization files is represented by sub-blocks of block 404 in FIG. 4. In particular, a log file is produced in a system format that describes resources for a build of the applications (block 406) and the log file is parsed to identify and extract localizable resources in the build (block 408). The extracted localized resources are then converted to generate a source resource file for the build in the standard format (block 410).

The log file in this case may be a default file that is produced as part of the build to describe corresponding resources of an application. Accordingly, the log file may be generated in an appropriate system format used for the build/project. The localization module 114 may operate to parse the log file to identify resources for translation based on metadata, tags, or other suitable data associated with resources in the log file. The localization module 114 may also extract these "localizable" resources to separate the localizable resources out from other resources. Additionally, the localization module 114 converts the localizable resources described in the log file to a suitable standard format (e.g., XLIFF) that is used for translations. This produces a source resource file that can be employed to update, create, and/or populate localization files 118 for the one or more languages that are ascertained per block 402.

The source resource file is merged with target localization files included in the project for the one or more languages to form localization files that are updated for the build (block 412). This may include populating changes to existing localization files and/or creating new localization files for different languages. To merge the files, resources are compared between the source resource file and each target localization file to find matching resources (block 414). The comparison may be used to identify items that have been added or changed. In addition, resources that have been previously translated may also be identified. If a localization file for a designated language does not exist, the localization module 114 may create a new localization file in the project. Then, resources in the source resource file are updated with matching resources from the target localization file (block 416). The resulting merged files may be saved as updated versions of the localization files that may replace the previous target files. Any changes and additions are therefore populated to the various localization files. Resources that have not changed may be retained and translations for source resources that have been removed may be deleted. Further, previous translations of matching resources from the target files may be merged into the updated versions. The output of this process is updated localization files for each of the designated languages that reflect changes made for the build and may include any previous translations. The updated localization files may be translated and incorporated into an application in various ways, some examples of which are discussed above and below.

Figure 5:
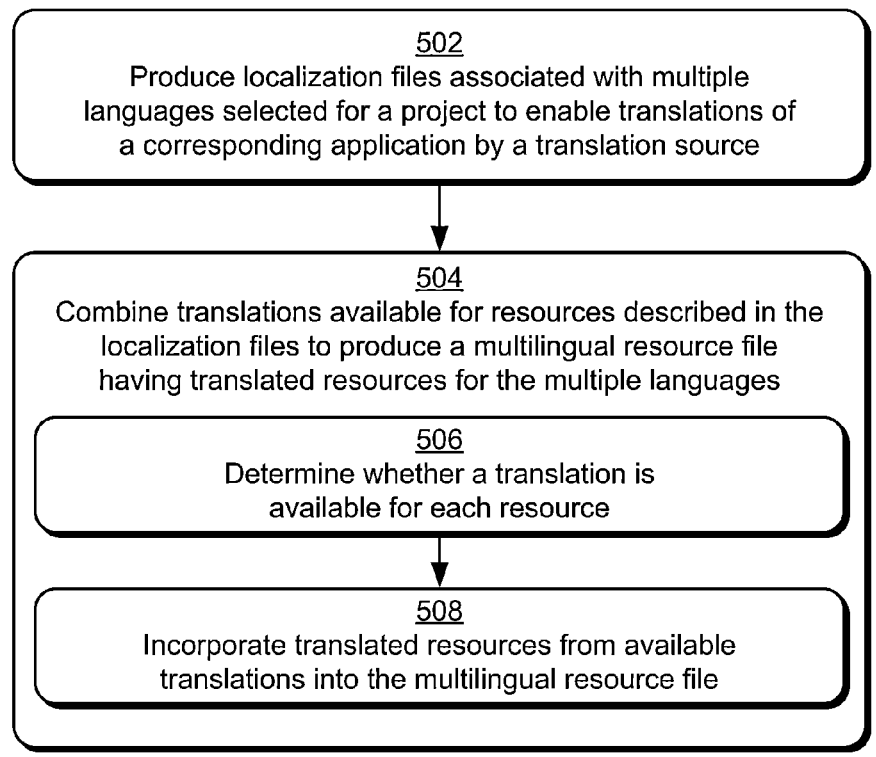
FIG. 5 is a flow diagram depicting a procedure in an example implementation in which available translations are used to form a single multilingual resource file for an application.

FIG. 5 is a flow diagram depicting a procedure 500 in an example implementation in which available translations are used to form a single multilingual resource file for an application. Localization files are produced that are associated with multiple languages selected for a project to enable translations of a corresponding application by a translation source (block 502). For instance, updated localization files for selected languages may be created via a localization module 114 in various ways described in relation to the previous figures. In at least some embodiments, localization files 118 are produced using XLIFF. The XLIFF file format is one example of a format suitable to enable translation by a variety of translation sources. Accordingly, a developer may choose to perform translations in various ways using XLIFF or another designated format. Translated files resulting from the translations may be stored in a database or other file storage location accessible to the localization module 114. The localization module 114 may then consume the translated files to construct a multilingual resource file for the project.

In particular, translations that are available for resources described in the localization files are combined to produce a multilingual resource file having translated resources for the multiple languages (block 504). This may occur in any suitable way. For example, the localization module 114 may check for available translations during each build of an application and use available translations to create a corresponding resource file. In one approach to combining available translations, a determination is made regarding whether a translation is available for each resource (block 506). For instance, the localization module 114 may examine and process XLIFF files for each language that are included in the project to discover translated resources. Then, translated resources for available translations are incorporated into the multilingual resource file (block 508). The incorporation of translated resource may generally involve creation of a log of various translated resources based on examination of the XLIFF files and conversion of the log from XLIFF (or another selected format) back into a system format associated with the application development. In this manner, a single multilingual resource file containing resources for multiple languages may be created for an application. The multilingual resource file may facilitate testing of the application during different builds and in different languages. Additionally, the multilingual resource file may be published with a completed version of the application to enable multilingual deployment and use.

Multilingual Build Integration for Compiled Applications

As mentioned, the techniques in the preceding section are suitable for applications and programming languages/models that may produce log files as part of a build process. The log files describe build updates and can be leveraged to implement in-build localizations in the foregoing manner. Generally, the techniques are designed to support build integration for modern applications programmed using dynamic scripting languages.

In the case of some applications and programming languages, suitable log files that can be used for localizations may not be produced as part of the application build. In other words, compilers for some programming languages and/or legacy applications (e.g., statically compiled languages/applications) may not natively generate log files comparable to those described above. The discussion now turns to extension of the previously described techniques to support build integration for such "compiled" applications and programming languages.

In general, multilingual build integration for compiled applications is supported by creating appropriate files corresponding to a build update that may be used to facilitate localizations. This may involve parsing and interpreting source files for the project to identify resources in the project that have been updated. Since log files having build update information may be unavailable for some applications, the system may be configured to produce suitable localization files 118 by processing raw source files. Thus, when log files are unavailable for a particular build, project, or programming language, the system may be designed to generate and handle substitute localization files 118 that provide indications of update resources and items in a project for translation. Additionally, the system may be configured to create and use dynamic resource files corresponding to the localization files 118 to compile and package multilingual resources in an appropriate format for the programming language. Further details of these and other aspects of multilingual build integration for compiled applications are described in relation to the following figures.

Figure 6:
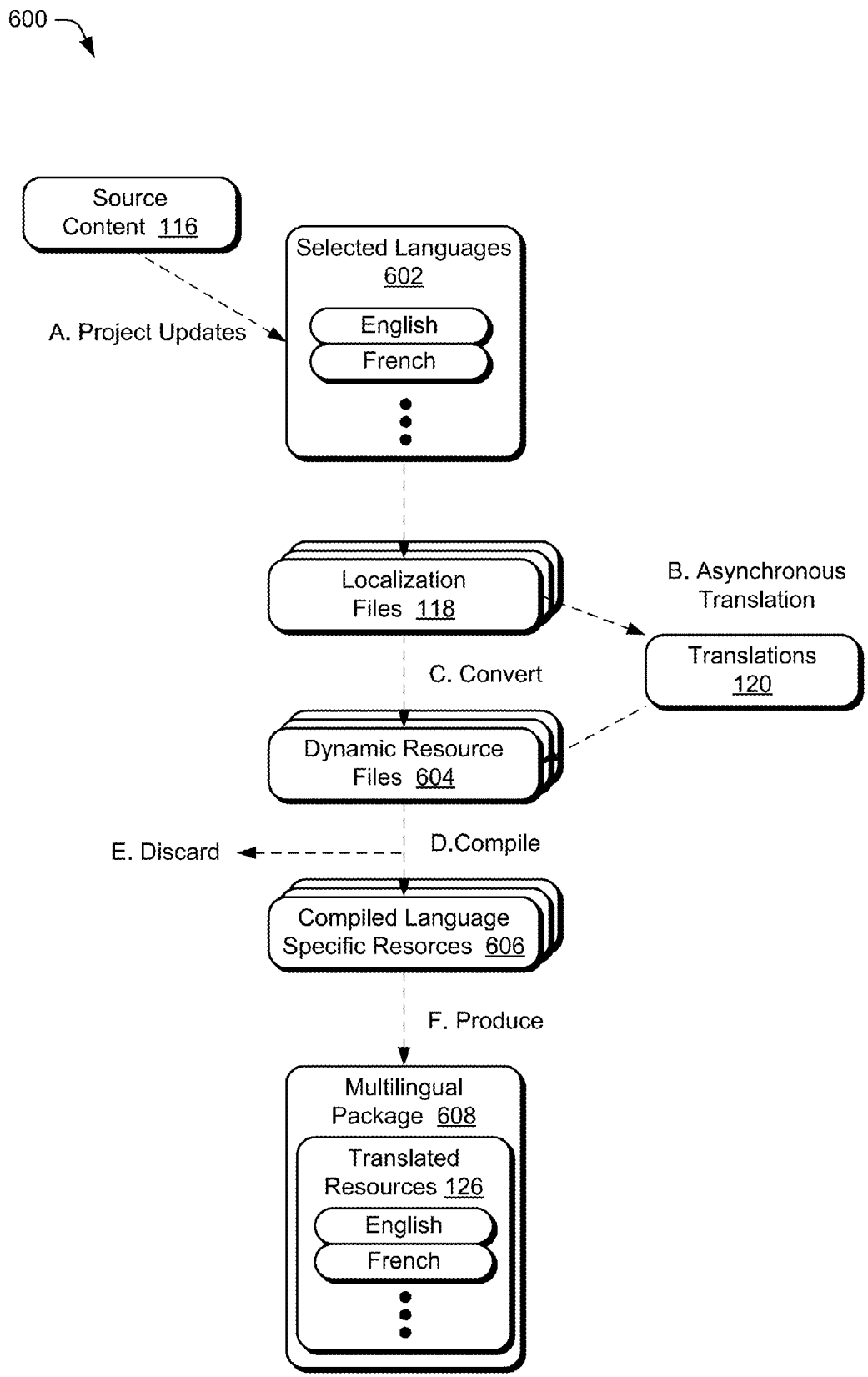
FIG. 6 is a diagram depicting techniques for multilingual build integration for compiled applications in accordance with one or more embodiments.

FIG. 6 is a diagram depicting generally at 600 techniques for multilingual build integration for compiled applications in accordance with one or more embodiments. Here, source content 116 for a project may be updated in the manner previously described. The project may include various selected languages 602 and corresponding sub-projects to handle translations as described in relation to FIG. 2. The sub-projects are employed to contain XLIFF or other kinds of localization files 118 for the project that may be updated as part of the build process. Instead of relying upon log files output by the build engine as described previously, the localization module 114 may operate to parse and interpret raw source resource files of the build to recognize updates that have occurred to the source code, identify localization issues and resources for translations, and initialize translations through a selected source. The process of translating localization files 118 contained in the project may then occur in the same manner as described above. Here, resources that have changed in the project and accordingly may be set-up for translation are identified by direct examination and processing of raw source resource files as opposed to interception and conversion of pre-generated log files as in the case of build integration for modern applications described previously.

As represented in FIG. 6, at act "A" project updates may occur that modify source content 116 in some manner. The project updates may be performed through an IDE that supports multilingual integration for selected languages 602. In one approach, raw source files for the project may be processed to identify resources to update. Specifically, localization files 118 included in the project for different languages may be updated to reflect changes made to the project. The updating may occur in a manner comparable to the process described in relation to FIG. 3 above. Here, modifications, additions, or deletions of resources to be merged with target localization files in the project are identified based on processing of the raw source files performed by the system/localization module 114. Merging of identified changes then produces updated localization files that reflect the project updates. Localization files 118 may have a designated file format such as XLIFF or another format designed to facilitate translations.

As before, updated localization files may be exposed for translation in various ways and translations may occur asynchronously with the particular build in which the updated localization files are produced. Asynchronous translation of resources to obtain translations 120 is represented by act "B". Translations 120 that are obtained from various sources may be fed back into the workflow in connection with converting localization files into dynamic resource files 604 as represented by act "C". In general, the dynamic resource files 604 are intermediary files that are created by transforming localization files for a project into programming language specific formats that may be employed to compile multilingual resources into a build. Dynamic resource files 604 may correspond to the particular programming language employed for the project and may be recognized and handled by an associated compiler for the particular programming language and/or development framework. In the course of building the dynamic resource files 604, the system may check whether translations (e.g., translations performed asynchronously) are available for each resource and generate the dynamic resource files 604 to incorporate any available translations that are discovered. A different dynamic resource file may be generated for each selected language of the project.

The dynamic resource files 604 may then be consumed by a compiler invoked by the system to compile language specific resources into the project. In particular, the localization module may invoke an appropriate compiler to compile the dynamic resource files 604 into compiled language specific files 606 as represented by act "D". The compiled language specific resources 606 are generated in a format appropriate for the particular programming language and/or development framework. A variety of different languages/frameworks and corresponding compilers may be supported by the IDE. As represented by Act "E", the dynamic resource files 604 are created and used during a build session for translations into and out of XLIFF or another designated file format. Accordingly, the dynamic resource files 604 may be employed for a particular session and are then discarded when the session/build is complete or at another selected time in the workflow. The dynamic resource files 604 therefore are created and recreated for each build session as a mechanism through which translations may be added to a compiled build through the IDE.

As represented by act "F", a multilingual package 608 may be produced to contain the compiled language specific resources 606 for the application. In particular, the multilingual package may contain translated resources 126 for each language supported by the application. The format for the multilingual package 608 may depend upon the particular programming language and/or development framework employed to develop the application. Generally, the multilingual package 608 provides a mechanism to distribute the project/application with the multilingual/translated resources in accordance with a corresponding publishing model. For instance, applications may be distributed via an application store provided by a service provider, on distributable media, and so forth. Additional details are described in relation to the following example procedure.

Figure 7:
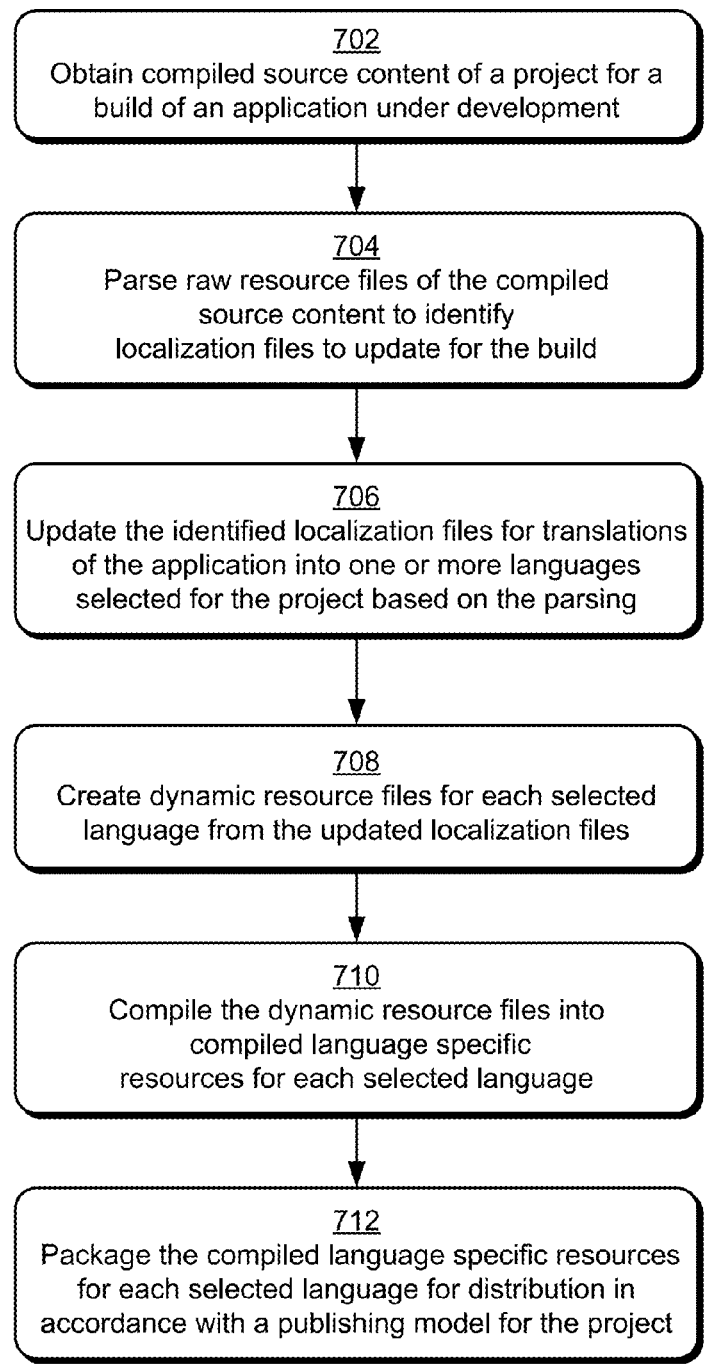
FIG. 7 is a flow diagram depicting a procedure in an example implementation in which dynamic resource files are created and compiled to produce multilingual packages for compiled applications in accordance with one or more embodiments.

FIG. 7 is a flow diagram depicting a procedure 700 in an example implementation in which dynamic resource files are created and compiled to produce multilingual packages for compiled applications in accordance with one or more embodiments. Compiled source content of a project is obtained for a build of an application under development (block 702). For example, a developer may make use of an IDE to create or update an application project. The IDE may incorporate a localization module 114 as described previously. During a build, the developer may make code changes and compile the project to produce raw resource files. The raw resource files may be intercepted and processed by the localization module 114 to translate the project into one or more selected languages.

In particular, raw resource files of the compiled source content are parsed to identify localization files to update for the build (block 704) and the identified localization files for translations of the application into one or more languages selected for the project are updated based on the parsing (block 706). Here, the IDE by way of the localization module 114 is operable to ascertain changes to the source code through direct manipulation of the source code. This may involve parsing the code to recognize updates that have occurred to the source code, identify localization issues for updated code portions and resources, and initialize translations of appropriate resources through a selected translation source. As discussed, XLIFF files or files having another designated file format for translations may be included in the project to facilitate translations. The updating produces updated files for translation having the designated format that reflect code changes for the build. These updated translation/XLIFF files may be exposed for asynchronous translation as discussed previously. The updated translation/XLIFF files may also be used to create dynamic resource files to enable incorporation of translated resources into the compiled output for the build of the application project.

To do so, dynamic resource files are created for each selected language from the dynamic resource files (block 708). The dynamic resource files are compiled into compiled language specific resources for each selected language (block 710). Then, the compiled language specific resources for each selected language are packaged for distribution in accordance with a publishing model for the project (block 710).

A different dynamic resource file may be generated for each selected language of the project. The dynamic resource files may be generated by deriving intermediary files corresponding to a particular programming language employed for the project from XLIFF/translation files and any available translations. In at least some embodiments, the dynamic resource files are configured as satellite assembly files for the particular programming language that may be compiled by a corresponding compiler. These satellite assembly files incorporate any available translations for XLIFF/translation files that are exposed for translations in prior builds or previously in the workflow. Subsequent builds may incorporate additional translations that may not be available for the current build. The satellite assembly files are then compiled by invoking an appropriate compiler. In at least some embodiments, compiling the dynamic resource files involves generating language specific dynamic link libraries (DLLs) to contain translated resources for each of the one or more selected languages.

In one particular example, the IDE supports multilingual build integration for development platforms/programming language that use static compilers/compiled code as opposed to dynamically compiled script. These include but are not limited to extensible application markup language (XAML) based mobile development platforms, one example of which is Silverlight. Such platforms may not natively make suitable log files that may be leveraged for translations available during the build process. As such, creation of dynamic resources files may be employed as a substitute for using log files. In the case of XAML based development platforms, the dynamic resources files may be configured as .resx files that may be recognized, handled, and compiled by the platform. Other types of platforms/programming language are also contemplated, in which case the dynamic resources files may be generated in corresponding formats that are appropriate for the selected platform.

As mentioned, the multilingual package provides a mechanism to distribute the project/application with the multilingual/translated resources in accordance with a corresponding publishing model. In at least some embodiments, producing the package involved enumerating the compiled language specific resources produced for the selected languages in a manifest for the application. Then, the manifest and compiled language specific resources are packaged together in the multilingual resource package for distribution with the application. More generally, availability of translated resources compiled within the project is indicated in some manner. This may be accomplished by listing the resources in a manifest, including metadata in the package, or by another suitable mechanism to identify the multilingual resources. These indications may be employed by a device, operating system, application store, and so forth to recognize the multilingual resources and/or languages supported by the application. The package having the resources and appropriate indication may then be distributed via an application store, on some form of computer readable media, or otherwise.

In combination, the foregoing build integration techniques support in-build localization for a wide spectrum of applications including both modern and legacy applications. When available, log files may be leveraged to derive localization files and translate resources. In other cases, the system may do the work to create appropriate localization files directly from source files when suitable logs are unavailable for a project. To accomplish this, raw source code may be parsed to identify updates, localization content, translation issues, and so forth. The, system then handles production and compilation of files to facilitate in-build translations for the resulting multilingual package. Thus, an IDE may be configured to integrate translations for a variety of applications and programming languages/frameworks within the build process. Developers may therefore be able to use a common interface and workflow to create multilingual applications for many different programming languages, platforms, and file formats directly as part of application builds.

Having considered details of multilingual build integrations for compiled applications, consider now a discussion of an example system and components that can be employed to implement embodiments of the techniques described herein.

Example System

Figure 8:
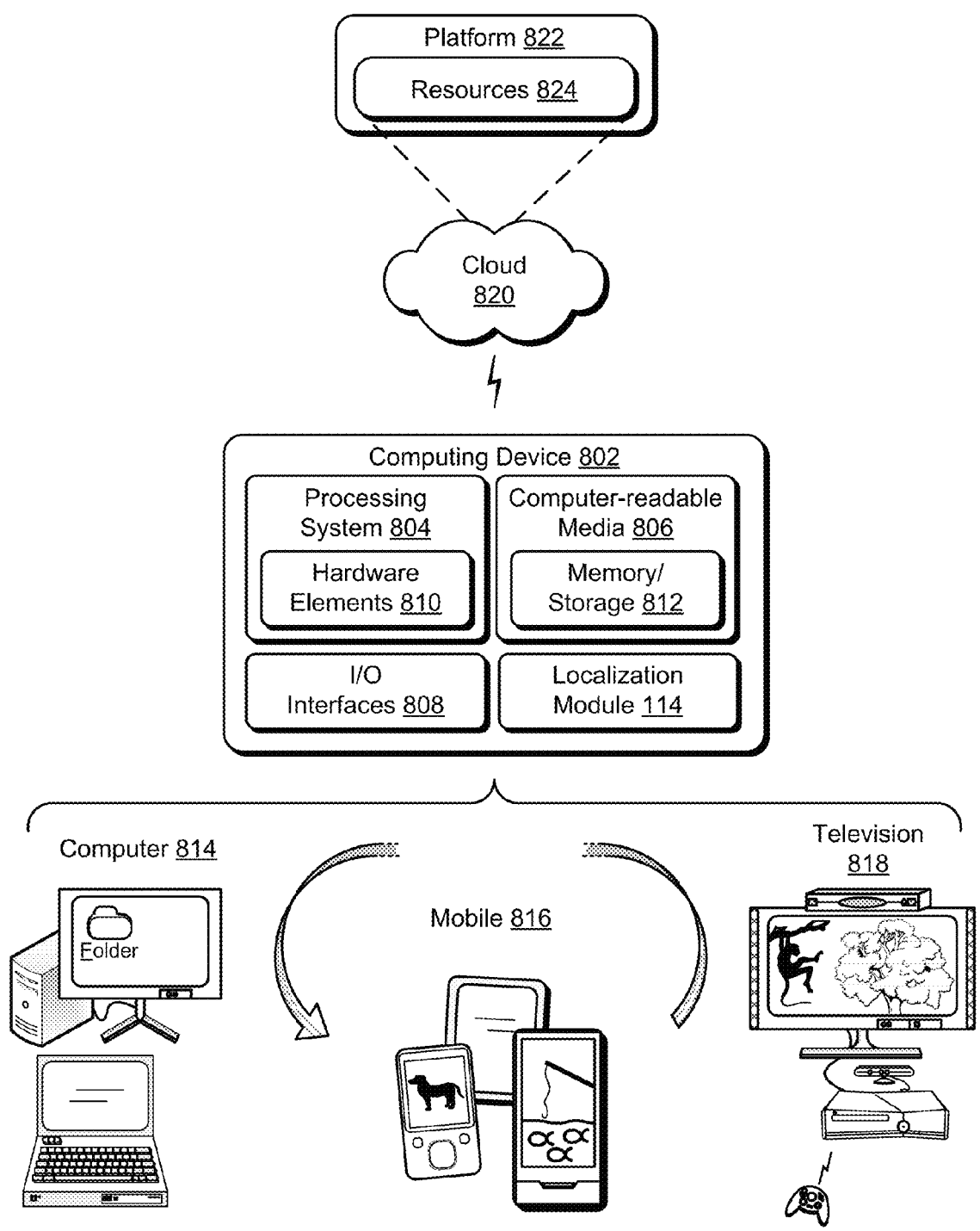
FIG. 8 illustrates an example system and components of the system that can be employed to implement embodiments of the techniques described herein.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 108, applications 110, development module 112, localization module 114 and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the localization module 114 on the computing device 802. The functionality of the localization module 114 and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
   parsing source content during the process of building an application to identify resources that were modified;
   updating localization files having a file format designated for translations into one or more selected languages selected for the application based on the resources that are identified as modified in the build such that the localization file reflects updates as resources are updated for each build;
   creating dynamic resource files based on the updated localization files that incorporate available translations for the resources;
   compiling the dynamic resource files into compiled language specific resource files for each of the one or more selected languages;
   discarding the dynamic resource files that are created for the build of the application when the build is complete; and
   producing a multilingual resource package for the application configured to contain the compiled language specific resource files for the application.

2. A method as described in claim 1, wherein the designated file format comprises extensible markup language localization interchange file format (XLIFF).

3. A method as described in claim 1, wherein the method is performed via a localization module provided as a component of an integrated development environment (IDE).

4. A method as described in claim 1, wherein updating the localization files comprises producing separate localization files in the designated file format for each selected language that reflect updates made to the source content for the build of the application, the updates derived according to the parsing.

5. A method as described in claim 1, wherein the application is written using a statically compiled programming language.

6. A method as described in claim 1, further comprising exporting the localization files to a selected storage location and invoking a translator to perform translations of the localization files.

7. A method as described in claim 1, wherein compiling the dynamic resource files comprises generating language specific dynamic link libraries (DLLs) to contain translated resources for each of the one or more selected languages.

8. A method as described in claim 1, wherein creating the dynamic resource files comprises building satellite assembly files to contain language specific resources for each of the one or more selected languages automatically as part of the build of the application using translations available for the build.

9. A method as described in claim 1, wherein translations of updated localization files produced during a particular build of the application are performed asynchronously with the particular build.

10. A method as described in claim 1, wherein producing the multilingual resource package comprises:
    enumerating the compiled language specific resources produced for each of the one or more selected languages in a manifest for the application;
    packaging the manifest and compiled language specific resources together in the multilingual resource package for distribution with the application.

11. A method as described in claim 1, wherein the application in an application developed using an extensible application markup language (XAML) based mobile development platform.

12. A method as described in claim 1, wherein the dynamic resource files are intermediary files that are created by transforming the localization files into a programming language specific format that compiles multilingual resources into the build.

13. One or more non-transitory computer-readable storage media storing instructions that, when executed by a computing device, implement a localization module configured to perform operations comprising:
    obtaining compiled source content of a project for a build of an application under development;
    parsing raw resource files of the compiled source content to identify localization files to update for the build, the identification based on portions of the source content that have been updated while the application is under development, the localization files having a designated file format to facilitate translations;
    updating the identified localization files for translations of the application into one or more languages selected for the project based on the parsing;
    creating dynamic resource files for each selected language from the updated localization files;
    compiling the dynamic resource files into compiled language specific resource files for each selected language; and
    packaging the compiled language specific resource files for each selected language for distribution in accordance with a publishing model for the project.

14. One or more non-transitory computer-readable storage media as described in claim 13, wherein the designated file format comprises extensible markup language localization interchange file format (XLIFF).

15. One or more non-transitory computer-readable storage media as described in claim 13, wherein one of said languages selected for the project is a pseudo language and the localization module is further configured to translate the project into the pseudo language via a pseudo-translation engine.

16. One or more non-transitory computer-readable storage media as described in claim 13, wherein the application is developed using a statically compiled programming language that does not produce a log file indicative of updated resources during project builds.

17. A computing device comprising:
    a processing system;
    one or more modules operable at least in part via hardware of the processing system to implement an integrated development environment (IDE) configured to:
        ascertain one or more languages selected by a developer for translations of an application under development using the IDE; and during a build of the application via the IDE, facilitate in-build translations of a multilingual resource package by generating updated localization files for each of the selected languages in a designated file format established to facilitate translations, the updated localization files reflecting updates that were made to the application, the updated localization files employed by the IDE during the build to:

create dynamic resource files for each selected language from the updated localization files when the updates are made to the application in the build;

compile the dynamic resource files into compiled language specific resource files for each selected language; and produce the multilingual resource package that contains the compiled language specific resource files for each selected language for distribution with the application.

18. The computing device of claim 17, wherein the integrated development environment (IDE) is further configured to:

output the updated localization files that are created to enable asynchronous translations via one or more translation sources;

obtain translations of localization files that are available during the build; and incorporate the translations that are obtained into the dynamic resource files that are created for inclusion in the compiled language specific resource files for the application.

19. The computing device of claim 17, wherein the designated file format comprises extensible markup language localization interchange file format (XLIFF).

20. The computing device of claim 17, wherein production of the multilingual resource package comprises:

enumerating the compiled language specific resources produced for each of the one or more selected languages in a manifest for the application;

packaging the manifest and compiled language specific resources together in the multilingual resource package for distribution of the application.

* * * * *